June 18, 1968 M. S. KEELER II, ET AL 3,389,391

VEHICLE IDENTIFICATION RESPONDER

Filed May 5, 1967

INVENTORS
MINER S. KEELER II
ROBERT C. THOMPSON
BY Price, Heneveld, Huizenga & Cooper
ATTORNEYS United States Patent Office 3,389,391

Patented June 18, 1968

3,389,391

VEHICLE IDENTIFICATION RESPONDER

Miner S. Keeler II, 2525 Indian Trail SE., Grand Rapids, Mich. 49506, and Robert C. Thompson, Muskegon, Mich.; said Thompson assignor to said Keeler Filed May 5, 1967, Ser. No. 636,508
17 Claims. (Cl. 343—6.8)

ABSTRACT OF THE DISCLOSURE

A passive device for receiving a transmitted RF signal and utilizing the received RF energy to transmit a binary-coded message which identifies the vehicle carrying the device, in which the transmitted binary-coded message is comprised of a pulse train basically consisting of a combination of two different tone-modulated pulses, one representing the binary number zero and the other representing the binary number one. The device features a ring-pulser network which conducts in a timed sequence controlled by a unijunction keying circuit and which produces a series of control signals which are fed into one or the other of two voltage-variable capacitors coupled into a tuned circuit in the transmitter oscillator, by which the transmitter output may be tone-modulated with either of two different tones. Further, a third tone representing the beginning and the ending of a complete message is produced by activating both such tone-modulating circuits. The aforementioned unijunction keying circuit also switches the transmitter on and off, such that it operates only during the time when a modulating tone is present, thereby conserving operating power.

*Background of the invention*

Responder devices in the general family of the present device have been used for some time in the past for a variety of analogous purposes; primarily to signal the presence of proximity of, or to identify, a vehicle such as a railroad car or the like. Typically, such vehicle does not contain a source of electrical power, and consequently, the responder devices are primarily passive in nature but equipped to receive transmitted RF energy and utilize this energy in transmitting a brief message back to the sending entity.

Some such previous devices were designed to transmit coded messages which identified the vehicle; however, the usage and the operation of such devices have been accompanied by significant cost and difficulty. The cost of a unit such as this to the user determines the true practicality and useability of the device, quite apart from its actual operation characteristics. The device must of course be elaborate or complex to the extent necessary to fully identify each of a great number of vehicles, and yet the cost per unit must be relatively low. Thus, previous devices which utilized crystal-controlled oscillators to produce with great accuracy a number of selected output frequencies accurately representative of an identification code have been expensive, primarily as a result of the presence of the crystals in the oscillators. Also, the amount of operating power required for proper transmission is of critical importance to the effectiveness of a device of this nature, and this also has been a significant problem in prior art devices.

*Summary of the invention*

The present invention provides a passive responder of the general type noted above but which obviates and eliminates the problems of cost and operational complexity and difficulty associated with previous such devices. For example, the device of the invention is free of expensive components such as crystals, and further is designed so that the circuitry producing the identifying message can be printed or etched in monolithic form at a fraction of the cost previously required for functionally similar circuitry. Also, the operational characteristics of the invention are different from prior devices in that the transmitted identifying message is comprised basically of only two different types of tone-modulated pulses forming a binary-coded message. Further, the transmitting circuitry is controlled in synchronism with the binary coding circuitry, so that the transmitter is actually switched off approximately half of the time during which a message is being transmitted, i.e., it is off during the intervals between the binary-coded pulses, thereby greatly reducing the amount of energy required for satisfactory transmission.

Briefly stated, the device of the invention comprises a receiver means for receiving transmitted RF energy to be used as operating and transmitting power, including rectifying, filtering, and voltage-regulating circuitry, together with a transmitting means coupled to the receiving means to receive power therefrom and including control circuitry for creating an output from the transmitter means comprising a pulse train having two distinguishably different pulse types appearing in a predetermined sequence and representing a binary-coded message identifying the vehicle carrying the responder apparatus.

*Description of the preferred embodiment*

Figures 1, 2:
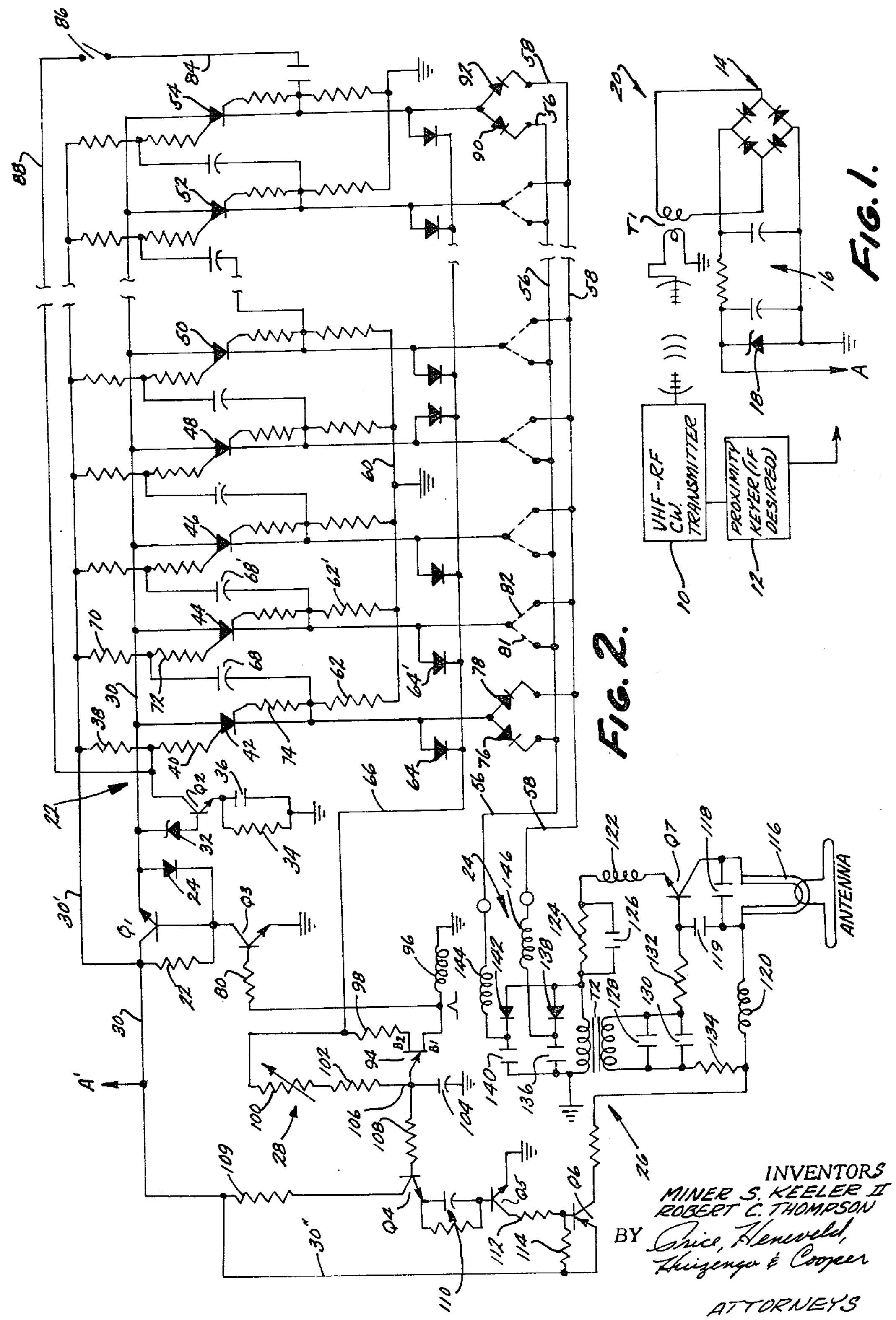
FIG. 1 is a schematic representation of the overall transmitting and receiving system in which the responder device of the invention operates, including a schematic circuit diagram of the receiver portion of the responder device.
FIG. 2 is a schematic circuit diagram showing the coding and transmitting circuitry of the device.

Referring specifically to the drawings, a typical transmitter 10 for sending RF energy to the responder device of the invention is illustrated in FIG. 1, as is a proximity keyer 12 of a conventional nature which may be used advantageously in such a system, but which is not an absolute necessity. As will be understood, the transmitter and the proximity keyer, if the latter is used, are normally located at a fixed interrogation point adjacent the path along which vehicles to be identified are to travel. As indicated by the labeling in FIG. 1, the transmitter 10 is preferably a VHF type, but the actual transmitter and its antenna, as well as the specific antenna of the responder device itself, is not truly a part of the present invention and these things are therefore to be considered merely as state-of-the-art devices so far as the present disclosure is concerned. It should be pointed out, however, that if the conditions expected to be encountered in operation provide for the passage of the vehicle to be identified very closely adjacent to the RF transmitter, as for example where a train of boxcars is passing through a tunnel or under a bridge or the like, RF energy may be supplied to the responder through transformer coupling, in which event a true transmitter and antenna system would not even be required.

Referring specifically to the responder of the invention, as FIG. 1 further illustrates, the RF energy provided to the responder is initially received through an input transformer T1 of the receiver means 20, from which the received signals are coupled to a full-wave diode rectifying bridge 14. The rectifying bridge 14 is coupled to a pi-type RC filter 16, and a Zener-type regulating diode 18 is coupled across the filter 16 to regulate the filtered DC voltage present at that point. Thus, the RF signals which were transmitted or otherwise supplied to the input transformer T1 of the receiver means 20 are changed to rectified, filtered, and regulated DC operating voltage, which is present at a positive output terminal A and a ground terminal.

The aforementioned operating voltage from output terminal A of the receiver means 20 is coupled to a power terminal A′ of the transmitter means circuitry shown in FIG. 2. Basically, this combined circuitry include certain functionally separable component groupings forming what may be referred to as control circuitry and transmitting circuitry. The control circuitry has a first circuit portion 22 which produces a time-spaced sequence of control signals, a second circuit portion 24 which operates to modulate the output of a transistor oscillator transmitter 26 with audio signals, and a keying circuit 28 which serves to switch the transmitting circuit 26 on and off during the period of operation of the device to conserve operating power and also to sequence and time the operation of the first circuit portion 22 noted above.

More specifically, the first circuit portion 22 receives operating power from terminal A′ upon both a primary supply conductor or buss 30 and a secondary such conductor or buss 30′ interconnected therewith, buss 30 having an on-off switching transistor Q1 interposed therein for opening this conductor and thereby removing the operating power otherwise supplied thereupon, whereas alternate or secondary power conductor 30′ has no such switching means interposed in it. The operation of transistor switch Q1 and the circuit elements associated therewith is discussed subsequently; for the present, it may be assumed that this transistor is normally conductive due to its positively-biased base, connected to buss 30 through resistor 22, operating power therefore flows through the collector and emitter of this transistor and is applied across a Zener regulating diode 32. The cathode of Zener diode 32 is connected to conductor or buss 30 and the anode thereof is connected to the base of a "start" transistor Q2, to switch the same on and off. The emitter of transistor Q2 is connected to the circuit ground through a parallel RC timing circuit including a resistor 34 and a capacitor 36, and the collector thereof is connected to the junction of a pair of voltage-dividing resistors 38 and 40, which interconnect the aforesaid secondary power conductor 30′ with the anode gate of a first silicon control switch (SCS) 42.

The latter element comprises the first switching means in a series of independently-operating identical such switches embodying SCS elements 44, 46, 48, 50, 52, and 54, all of which have their anode connected to power conductor 30 and their cathode connected in one of three possible ways to either or both of a pair of control signal conductors 56 and 58. Additionally, the cathode of each such SCS is connected to a common ground terminal 60 through a signal-developing resistor (such as resistors 62 and 62′, seen in connection with SCS elements 42 and 44, respectively), and the junction of such cathode and signal-developing resistor is, in the case of each SCS, connected through a diode such as 64 to a common conductor 66 leading to the keying circuit 28 mentioned previously. Further, this cathode junction of each SCS element is also connected through a coupling capacitor such as 68 to the junction of a pair of voltage-dividing resistors such as 70 and 72, seen in connection with SCS 44, in the same manner that the collector of the "start" transistor Q2 was coupled to the junction of resistors 38 and 40, as noted previously. Finally, the aforesaid cathode junction of each SCS element is also connected to the cathode gate of that particular SCS, through a resistor such as is seen at 44 in connection with SCS 42. Since, as stated, the circular components in each SCS stage are identical, each such element is not specifically designated and described, the aforementioned description being deemed typical and exemplary of each such stage.

The several SCS elements and their associated circuitry described immediately above comprise what is known to those skilled in the art as a "ring-pulser" circuit, in which each element conducts (i.e., is switched on and off) sequentially, until the entire array of such switches has conducted. In the present case, Zener diode 32 is selected for the minimum desired operating voltage for the device, such that until this magnitude of voltage builds up following receipt from the transmitting means 10 seen in FIG. 1, the "start" transistor switch Q2 will remain at cut-off, while the voltage present on busses 30 and 30′ steadily rises. When this pre-selected minimum operating voltage is reached, however, the Zener 32 condutcs to saturate "start" transistor Q2, thereby causing an immediate and sudden decrease in the voltage applied to the anode gate of SCS 42 through resistors 38 and 40, by in effect tying the junction of these two resistors to ground potential. This voltage drop is sufficient to switch SCS 42 into conduction. This provides a current flow from power buss 30 through the signal-developing resistor 62 in the cathode of this switch element, thereby applying a developed signal through diode 64 to the keyer circuit conductor 66, and also through both diodes 76 and 78 to both of the control signal conductors 56 and 58.

As will be seen subsequently, control signals present on either conductor 56 or 58 initiate a tone modulation of the output of transmitter 26. As also will be seen, the signals simultaneously coupled to the keyer circuit 28 result in a time-delayed pulse coupled through a resistor 80 to the base of a transistor Q3. This biases the latter into conduction and connects the base of the "on-off" transistor Q1 to the circuit ground, thereby driving the latter transistor out of conduction momentarily. This, together with the operation of a shorting diode 24 which promotes sharp cut-off, creates a temporary absence or "notch" in the operating power supplied on conductor 30 to the remainder of circuit portion 22, thereby momentarily interrupting the voltage on the anode of all of the SCS elements, including SCS 42, which terminates the conduction thereof. It is to be noted that while SCS 42 is conducting, substantially the same potential will be impressed on each side of the coupling capacitor 68 interconnecting the two switching stages embodying SCS elements 42 and 44, and that consequently this coupling capacitor will not under these conditions be charged. However, at the instant that SCS element 42 is cut off in the manner just stated, the potential on the side of coupling capacitor 68 which is connected to the cathode of SCS 42 is rapidly lowered, and this capacitor therefore rapidly charges. This initiates a very sudden instantaneous drop in potential at the point between voltage-divider resistors 70 and 72, connected to the anode gate of SCS element 44, and this drop is sufficient to trigger the latter element into conduction, even though its anode gate almost instantly returns to the positive potential previously present there.

Once SCS element 44 has gone into conduction in the foregoing manner, it functions in the same manner as SCS element 42, discussed above, i.e., it develops an output voltage across its cathode resistor 62′, which output voltage is coupled through a diode 64′ to the keyer circuit conductor 66 and also coupled through one of two possible paths, indicated in phantom at 81 and 82, to one or the other of the control signal conductors 56 and 58. Preferably, a tab-type connector is used to complete the desired circuit path 81 or 82, since this provides a ready and easy way to change this circuit path if desired. In the manner generally stated previously, the presence of an output signal on the keyer circuit conductor 66 produces a time-delayed momentary interruption in the power supplied to the first circuit portion 22 on power buss 30, thereby returning SCS element 44 to cut-off, whereupon a coupling capacitor 68′ between SCS elements 44 and 46 operates in the same manner as coupling capacitor 68, noted previously, to swing SCS element 46 into conduction.

In the manner just set forth, each of the switching stages in the ring-pulser network embodying SCS elements 42 through 54 operates independently in a controlled sequence to produce the aforementioned control signals on conductors 56 and 58, and also on keyer conductor 66. If desired, this sequence may be repeated as long as operating power is present by using a coupling capacitor 84 and a conventional switch 86 to couple the cathode of the last SCS element 54 back through a conductor 88 to the anode gate of the first SCS element 42, such that when element 54 has conducted and been returned to cut-off, the entire sequence of conduction through the various SCS elements will be repeated. It should also be noted that, as indicated by the break or separation of switching elements 50 and 52, the ring-pulser circuit formed by the array of SCS elements shown may be expanded to include as many of the identical switching stages as may be required to provide a binary code system which is sufficiently large to include all of the vehicles in the group which is to be separately identified. However, like the first such switching stage embodying SCS element 42, the last such stage, embodying SCS element 54, is coupled to both of the control signal conductors 56 and 58, through a pair of diodes 90 and 92, whereas the intermediate stages are coupled through the aforementioned tab connectors to only one or the other of conductors 56 and 58, so as to provide a control signal to only a selected one of this pair of conductors. As will be seen, this selection forms the binary code which is to identify a given vehicle.

The keying circuit 28 noted previously embodies a unijunction device 94, one base terminal of which (identified $B_1$) is connected through a choke 96 to the circuit ground, while the second base terminal of which (identified $B_2$) is connected through a first fixed resistor 98, a variable resistor 100, and a second fixed resistor 102, to the emitter or input of the unijunction device. As illustrated, the junction of base one ($B_1$) of the unijunction and the choke 96 is connected to resistor 80 in the base circuit of transistor Q3 described above, whereas the junction of fixed resistor 98 in the base two ($B_2$) circuit of the unijunction and the variable resistor 100 is connected to the keyer circuit conductor 66, to which pulses are supplied from each of the aforementioned SCS stages.

Resistors 100 and 102 in the base two circuit of the unijunction 94 form a charging path for a timing capacitor 104, which is coupled to the junction 106 of resistor 102 and the emitter of the unijunction. Thus, the pulses which are present on keyer circuit conductor 66 will operate to charge capacitor 104 at an RC rate controlled by the combination of variable resistor 100 and fixed resistor 102, such that the occurrence of the voltage level at which the unijunction will trigger for conduction to base one ($B_1$) is controllable, and the same may be set to occur a desired interval after the pulse is initially present on conductor 66. When the unijunction does trigger, the pulse applied through its base one ($B_1$) to the choke 96 is shaped thereby into a sharp spike (indicated on the drawing), and this is the pulse which is applied to the base of transistor Q3 to trigger this transistor into conduction and thereby drive the switching transistor Q1 out of conduction to briefly interrupt the supply of operating power to the SCS circuitry upon conductor or buss 30.

During the interval when timing capacitor 104 is being charged, and before the triggering point of the unijunction 94 is reached, the rising voltage on this timing capacitor is applied through a resistor 108 to the base of a switching transistor Q4, which thus will be driven into conduction prior to the triggering of the unijuction. When transistor Q4 conducts, it supplies operating voltage from buss 30 through a resistor 109 to an RC timing circuit 110 and thence to the base of a second switching transistor Q5, to drive the latter into conduction. This transistor has its emitter grounded and its collector connected through a resistor 112 to the base of a primary switching transistor Q6, which controls the supply of operating power to the transmitter 26 from a conductor 30″, which is connected to the primary power buss 30. Normally, i.e., when transistors Q4 and Q5 are at cut-off, the full voltage present on power conductor 30″ is applied to the base of transistor Q6 across a resistor 114, through which there is no current flow when transistor Q5 is at cut-off. This holds transistor Q6 at cut-off, inasmuch as it is a PNP-type transistor. However, when switching transistor Q5 is driven into conduction, it form a voltage divider network of resistors 114 and 112 by connecting the latter to the circuit ground, thereby greatly lowering the potential applied to the base of transistor Q6 and allowing it to conduct, thus supplying operating power to the transmitter network 26 and causing it to operate.

It will thus be seen that the transmitter 26 is activated almost as soon as a pulse appears on the keyer conductor 66 from one of the SCS stages in the ring-pulser circuitry of circuit portion 22. The transmitter will remain activated until the charge on the timing capacitor 104 builds up to the point which triggers the unijunction 94 into conduction through its base one ($B_1$, at which time the base voltage is removed from switching transistor Q4, to cut off conduction through the same. Following this, the capacitor in parallel circuit 110 quickly discharges to remove the bias from the base of transistor Q5, which then goes into cut-off to cause a simultaneous cut-off of the primary switching transistor Q6, thereby de-energizing the entire transmitter circuit 26. At the same time, of course, the triggering of the unijunction 94 into conduction through its base one electrode also causes the ring-pulser circuitry to switch conduction from one SCS element to the next succeeding one. Thus, the transmitter will have been operating during the time that a pulse was provided from the ring pulser, but not otherwise.

The transmitter circuity 26 is an audio-modulated RF oscillator utilizing a single transistor, designated as Q7. The oscillator circuit includes an antenna loop 116 connected to the collector of transistor Q7 and bypassed by a tuning capacitor 118, with an RF choke 120 between the antenna and the DC power supplied from transistor Q6. A similar choke 122 is coupled to the emitter of transistor Q7 and leads to a load resistor 124 having an RF bypass condenser 126 thereacross. The load resistor 124 is in turn connected to the primary winding of a coupling transformer T2, by which signals from the emitter of transistor Q7 are fed back to the base thereof. The secondary winding of transformer T2 is tuned for initial oscillatory operation of transistor Q7 by parrale capacitors 128 and 130 and connected into the base circuit of transistor Q7, through a resistor 132, such that the voltages transformed across transformer T2 will change and in effect modulate the oscillating output of transistor Q7 appearing on the antenna 116.

The primary winding of transformer T2 is tuned by a pair of circuit branches, each of which include a fixed capacitor 136 and 140, respectively, and a voltage-variable capacitor diode 138 and 142, respectively, which are series-connected to the aforesaid fixed capacitors. As will be understood, the voltage-variable capacitor diodes 138 and 142 are commercially available and are commonly referred to as "varactors." It may be observed from the circuit illustrated that the control signal conductors 56 and 58 from the first circuit portion 22 are each connected through an RF choke 144 and 146, respectively, to the junction of fixed capacitor 140 and varactor 142, and the junction of fixed capacitor 136 and varactor 138, respectively. Consequently, it will be apparent that the control signals impressed on conductors 56 and 58 from the ring-pulser circuitry will act to vary the capacitance of one or the other of the varactor diodes 138 and 142, and thereby tune the primary winding of transformer T2 in different ways. This produces two possible tone modulations of the output from the transmitter circuit 26, either of which will be selected by the particular connections of the various SCS elements to the control circuit conductors 56 and 58.

It should be noted that, as stated previously, the first and last SCS elements 42 and 54, respectively, in the ring-pulser circuitry are connected through blocking diodes to both of the control signal conductors 56 and 58; consequently, when either SCS element 42 or 54 is in a state conduction, both varactors 138 and 142 will be biased into operation to combine in tuning the primary winding of transformer T2 in a third possible manner, i.e., with a tone that is a combination of and is therefore different from the tones which are produced when only one or the other of the varactors is separately energized.

Having now fully set forth the details and general operation of each portion of the circuitry forming the responder device of the invention, its overall operation will likely also be apparent. Upon receiving transmitted RF energy, the resulting rectified, filtered and regulated DC voltage applied to the circuit of FIG. 2 at terminal A' initiates sequential conduction of the various SCS switching stages of the ring-pulser circuitry of the first circuit portion 22 as soon as the operating voltage present on power buss 30 has built up to the predetermined level. When the first SCS element 42 goes into conduction to produce the first control signal, the transmitter circuit 26 is activated through switching transistors Q4, Q5, and Q6, and inasmuch as the cathode of SCS element 42 is connected by diodes 76 and 78 to both control circuit conductors 56 and 58, the output of the transmitter circuit is modulated by the third possible tone mentioned previously. This third tone is taken as the starting point in the binary-coded identification message.

The initial conduction of SCS element 42 is soon terminated through the action of the unijunction keyer circuit 28 in the manner stated above, at which time the transmitter circuit 26 is also switched off or de-energized to conserve power. An instant later, the second SCS element 44 in the ring-pulser circuitry is switched into conduction to provide a control signal pulse to one or the other of the control signal conductors 56 or 58, thereby modulating the output of the transmitter circuitry (then switched on once again) with either the first or the second aforementioned tone, the transmitter circuitry having been turned on once again through the unijunction keying circuit upon the appearance of a keying pulse on conductor 66.

In this manner, the transmitter is alternatingly turned on and off, and when on is modulated by one or the other of the modulating tones brought about by energization of one or the other of the varactor elements 138 or 142. Transmitter pulses modulated by one of these tones are preselected as representative of a binary zero, whereas pulses modulated by the other such tone are taken as the binary number one. Consequently, the sequential conduction of the intermediate switching stages in the ring pulser circuitry initiate a binary-coded identification message whose exact form is dictated by the particular connection of each SCS cathode to one or the other of the control signal conductors 56 or 58.

When the last SCS element 54 in the ring-pulser is in conduction, the transmitter output is once again modulated by the third possible tone, inasmuch as the cathode of this SCS element is connected to both of the control signal conductors through diodes 90 and 92. The presence of this third tone signals the end of the binary message. As state previously, the ring-pulser circuitry may, by closing switch 86, be made to operate in an endlessly cycling manner which will last so long as operating voltage is present. However, if one complete cycle of binary-coded transmission is deemed adequate, switch 86 may be left open or the entire loop of which it is a part simply not incorporated in the device.

From the foregoing, those skilled in the art will immediately recognize that the present invention provides a highly unique solution to the basic needs underlying such a responder device. Identification serial numbers are practically unlimited, since a relatively small number of switching stages in the ring pulser will create a very large number of possible binary-coded identification numbers. Further, since all of the SCS units are the same and it is possible to incorporate the ring pulser in printed, deposited, or other monolithic form, a remarkable degree of miniaturization may be achieved at a relatively small manufacturing cost. The power required to run the device is very small inasmuch as only one SCS switching branch is in conduction at any one time, inasmuch as only a single transistor serves as the transmitter oscillator, and inasmuch as the transmitter circuit is turned off approximately one-half of the time during the total operating cycle. As will be understood, the reception and decoding of the binary-coded tone-modulated transmitter output may be readily accomplished through a receiving unit having a lock-on type of sequential decoder, for example, of the type illustrated and disclosed in our previous U.S. Patent Number 3,295,135.

It is entirely conceivable that upon examining the foregoing disclosure, those skilled in the art may devise embodiments of the concepts involved which differ somewhat from the embodiments shown and described here, or may make various changes in structural details to the present embodiment. Consequently, all such changed embodiments or variations in specific circuitry or structure which utilize the concepts of the invention and clearly incorporate the spirit thereof are to be considered as within the scope of the claims appended herebelow, unless these claims by their language specifically state otherwise.

We claim:

1. Object identification responder apparatus, comprising in combination: means for receiving transmitted RF energy, to be used as operating power for the apparatus; transmitter means coupled to said receiving means to receive operating power therefrom; and control circuitry interposed in circuit with said receiving means and said transmitter means, for creating an output from the latter which comprises a series of pulses having two distinguishably different pulse types appearing in a predetermined relative sequence and representing a coded message identifying the object carrying the responder apparatus; said control circuitry including ring pulser circuit means comprising plural serially intercoupled switch means stages, each for individually producing certain control signals in a time-spaced sequence thereof which are coupled to said transmitter means and which control the same to produce said output therefrom.

2. The responder apparatus of claim 1, wherein said ring pulser circuit means comprises a monolithic structure in printed or like form.

3. The responder apparatus of claim 1, wherein said ring pulser circuit means comprises a ganged series of switch stages each containing an SCS element, the anode gate of each such element being connected through time-delay circuitry to the cathode of the like element in the preceding switch stage.

4. The responder apparatus of claim 1, further including manually connectable and disconnectable movable connector elements for connecting each of said switch stages to said transmitter means, to facilitate setting, changing, and rechanging of said coded message.

5. The responder apparatus of claim 1, wherein said control circuitry further includes circuit means coupled to said transmitter means for switching the said output thereof off during at least a portion of the time between said output pulses in said series to conserve operating power required for transmission, and said circuit means also being coupled to said ring pulser circuit means for controlling the time-spacing in said sequence of control signals.

6. The responder apparatus of claim 5, wherein said circuit means includes at least one adjustable element for varying said portion of time when said output is switched off and for varying said time-spacing in said sequence.

7. The responder apparatus of claim 5, wherein said transmitter means includes a transmitter oscillator and modulating means coupled to said oscillator for modulating the output thereof, said modulating means including a tuned circuit and component elements coupled to said tuned circuit, said elements being responsive to said control signals produced by said ring pulser means stages by changing the resonant frequency of said tuned circuit.

8. The responder apparatus of claim 7, wherein said modulating means component elements comprise voltage-variable capacitive elements.

9. The responder apparatus of claim 1, wherein said transmitter means includes a transmitter oscillator and modulating means coupled to said oscillator for modulating the output thereof, said modulating means including a tuned circuit and component elements coupled to said tuned circuit, said elements being responsive to said control signals produced by said ring pulser means stages by changing the resonant frequency of said tuned circuit.

10. The responder apparatus of claim 9, wherein said modulating means component elements comprise voltage-variable capacitive elements.

11. The responder apparatus of claim 9 wherein said modulating means includes a pair of said component elements each for effecting the modulation of said transmitter oscillator output to produce one of said two pulse types; each of said modulating means component elements being connected to predetermined ones of said switching means stages and being responsive to the control signal produced thereby to produce said coded messages.

12. The responder apparatus of claim 11, wherein said ring pulser circuit means switch stages each contain an SCS element.

13. The responder apparatus of claim 11, wherein said ring pulser circuit means comprises a monolithic structure in printed or like form.

14. The responder apparatus of claim 11, wherein said modulating means component elements comprise voltage-variable capacitive elements.

15. The responder apparatus of claim 14, further including manually connectable and disconnectable movable connected elements for connecting each of said switch stages to at least one of said two voltage-variable capacitative elements comprising said component elements, to facilitate setting, changing, and rechanging of said coded message.

16. The responder apparatus of claim 15, wherein said ring pulser switch means stages each contain an SCS element.

17. The responder apparatus of claim 15, wherein said ring pulser circuit means comprises a monolithic structure in printed or like form.

References Cited

UNITED STATES PATENTS

| | | | |
|---|---|---|---|
| 3,142,836 | 7/1964 | Ambrose | 343—6.8 |
| 3,270,338 | 8/1966 | Watters | 343—6.5 |
| 3,290,675 | 12/1966 | Neild | 343—6.5 |

RODNEY D. BENNETT, *Primary Examiner.*

M. F. HUBLER, *Assistant Examiner.*